United States Patent
Zhang et al.

(10) Patent No.: US 11,405,193 B2
(45) Date of Patent: Aug. 2, 2022

(54) ENCRYPTED PHOTOGRAPHING METHOD AND SYSTEM BASED ON FINGERPRINT RECOGNITION

(71) Applicant: HUIZHOU TCL MOBILE COMMUNICATION CO., LTD, Huizhou (CN)

(72) Inventors: Yinge Zhang, Huizhou (CN); Zhaosheng Zhang, Huizhou (CN); Xu Feng, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 787 days.

(21) Appl. No.: 16/326,598

(22) PCT Filed: Dec. 8, 2017

(86) PCT No.: PCT/CN2017/115245
§ 371 (c)(1),
(2) Date: Feb. 19, 2019

(87) PCT Pub. No.: WO2018/113537
PCT Pub. Date: Jun. 28, 2018

(65) Prior Publication Data
US 2021/0288797 A1     Sep. 16, 2021

(30) Foreign Application Priority Data
Dec. 22, 2016 (CN) .......................... 201611198573.5

(51) Int. Cl.
*H04N 5/232* (2006.01)
*G06V 40/12* (2022.01)
*G06V 40/13* (2022.01)
*G06V 40/50* (2022.01)
*G06F 21/32* (2013.01)
*G06F 21/60* (2013.01)
*H04L 9/06* (2006.01)
*H04L 9/08* (2006.01)

(52) U.S. Cl.
CPC ........ *H04L 9/0866* (2013.01); *G06V 40/1365* (2022.01); *G06V 40/50* (2022.01);
(Continued)

(58) Field of Classification Search
CPC ........... H04N 5/23245; H04N 5/23229; H04N 5/232216; G06F 21/32; G06F 21/602;
(Continued)

(56) References Cited

U.S. PATENT DOCUMENTS 8,004,593 B2 * 8/2011 Kusaka .................. H04N 5/222
  348/333.02
10,152,625 B2 * 12/2018 Han ........................ G06K 9/00
(Continued)

FOREIGN PATENT DOCUMENTS

CN     103699847 A     4/2014
CN     104253933 A     12/2014
(Continued)

*Primary Examiner* — Marly S Camargo
(74) *Attorney, Agent, or Firm* — PV IP PC; Wei Te Chung; Ude Lu

(57) ABSTRACT

An encrypted photographing method based on fingerprint recognition, and a system thereof are disclosed. The method may include: when detecting starting an encrypted photographing mode, obtaining an unlocking fingerprint for starting the encrypted photographing mode; when detecting a photographing instruction, generating an original photo and generating a key pair based on the unlocking fingerprint wherein the key pair may include an encryption key and a decryption key; encrypting the original photo according to the encryption key so as to generate an encrypted photo; and generating a corresponding system directory according to the decryption key, and saving the encrypted photo to the generated system directory. The present disclosure improves the security of a photo, and avoids leaking the content of an encrypted photo.

20 Claims, 1 Drawing Sheet

(52) U.S. Cl.
CPC ....... *H04L 9/0618* (2013.01); *H04N 5/23229* (2013.01); *H04N 5/23245* (2013.01)

(58) Field of Classification Search
CPC .. G06V 40/12; G04V 40/1365; H04L 63/042; H04L 63/08661; H04L 63/0866; H04L 9/0618

See application file for complete search history.

(56) References Cited

U.S. PATENT DOCUMENTS

| | | | |
|---|---|---|---|
| 11,182,588 B2* | 11/2021 | Yu | G06V 40/341 |
| 2011/0314304 A1* | 12/2011 | Braams | G06F 21/79 |
| | | | 713/193 |
| 2014/0359758 A1* | 12/2014 | Lee | G06F 21/32 |
| | | | 725/19 |
| 2016/0103984 A1* | 4/2016 | Warner | G06F 21/32 |
| | | | 713/186 |
| 2019/0347395 A1* | 11/2019 | Chao | G06F 21/32 |
| 2020/0019684 A1* | 1/2020 | Huang | G06F 21/32 |
| 2020/0370851 A1* | 11/2020 | Shahbaz | G06V 40/12 |
| 2022/0024669 A1* | 1/2022 | Tada | H04L 29/06 |

FOREIGN PATENT DOCUMENTS

| | | |
|---|---|---|
| CN | 105306822 A | 2/2016 |
| CN | 106096511 A | 11/2016 |
| CN | 106161947 A | 11/2016 |
| CN | 106603920 A | 4/2017 |
| JP | 2010226506 A | 10/2010 |

* cited by examiner

ENCRYPTED PHOTOGRAPHING METHOD AND SYSTEM BASED ON FINGERPRINT RECOGNITION

TECHNICAL FIELD

The present disclosure relates to the technical field of mobile terminals, particularly relates to an encrypted photographing method and system based on fingerprint recognition.

BACKGROUND

With the development of mobile terminal technology, the photo effect of a camera on a mobile terminal is getting better and better, so more and more people use the mobile terminal to take pictures. The image taken by the existing mobile terminal can be viewed freely, that is, as long as the image is obtained, the image content can be opened and viewed. In this way, if important image files are lost or accidentally leaked, it is easy to cause some classified content to be disclosed or leaked. Therefore, the image data captured by the existing mobile terminal has a problem of low security.

Therefore, the current technology in the field needs to be improved and further developed.

SUMMARY

The present disclosure is to address the deficiencies in the existing technology in the field, and provides an encrypted photographing method and system based on fingerprint recognition to achieve the encryption of photos taken by a mobile terminal through the fingerprint recognition technology, thereby improving the security of the photos. The technical solution disclosed by the present disclosure is set forth below.

In one aspect of the present disclosure, an encrypted photographing method based on fingerprint recognition is provided. The method may include:

when detecting starting an encrypted photographing mode, obtaining an unlocking fingerprint for starting the encrypted photographing mode;

when detecting a photographing instruction, generating an original photo and generating a key pair based on the unlocking fingerprint wherein the key pair comprises an encryption key and a decryption key;

encrypting the original photo according to the encryption key to generate an encrypted photo; and generating a corresponding system directory according to the decryption key, and saving the encrypted photo to the system directory.

In an exemplary implementation, the encrypted photographing method based on fingerprint recognition further includes:

when receiving an instruction to view the encrypted photo, obtaining a corresponding decryption key according to the system directory where the encrypted photo is saved;

using the decryption key to decrypt the encrypted photo; and if the decryption is successful, providing a viewing permission for the encrypted photo and displaying the original photo.

In an exemplary implementation, the step of, when detecting starting an encrypted photographing mode, obtaining an unlocking fingerprint for starting the encrypted photographing mode includes:

when detecting an instruction for triggering an encrypted photographing mode, obtaining an entered current fingerprint;

determining whether the current fingerprint conforms to a preset fingerprint database; and if the current fingerprint conforms to the preset fingerprint database, starting the encrypted photographing mode and setting the current fingerprint to be an unlocking fingerprint.

In an exemplary implementation, the step of, when detecting a photographing instruction, generating an original photo and generating a key pair based on the unlocking fingerprint wherein the key pair comprises an encryption key and a decryption key includes:

when detecting a photographing instruction, generating a fingerprint recognition code according to the unlocking fingerprint; and generating the key pair according to the fingerprint recognition code, wherein the key pair comprises the encryption key and the decryption key.

In an exemplary implementation, the step of encrypting the original photo according to the encryption key to generate an encrypted photo may include:

encrypting the original photo using a symmetric encryption algorithm according to the encryption key, and generating the encrypted photo.

In another aspect of the present disclosure, an encrypted photographing system based on fingerprint recognition is disclosed. The encrypted photographing system may include:

a fingerprint obtaining module configured to, when detecting starting an encrypted photographing mode, obtain an unlocking fingerprint for starting the encrypted photographing mode;

a key generating module configured to, when detecting a photographing instruction, generate an original photo and generate a key pair based on the unlocking fingerprint wherein the key pair comprises an encryption key and a decryption key;

an encrypting module configured to encrypt the original photo according to the encryption key to generate an encrypted photo; and a saving module configured to generate a corresponding system directory according to the decryption key, and save the encrypted photo to the system directory.

In an exemplary implementation, the encrypted photographing system according to the present disclosure further includes a decrypting module, wherein the decrypting module may include:

a first obtaining unit configured to, when receiving an instruction to view the encrypted photo, obtain a corresponding decryption key according to the system directory where the encrypted photo is saved;

a decrypting unit configured to use the decryption key to decrypt the encrypted photo; and a displaying unit configured to, if the decryption is successful, provide a viewing permission for the encrypted photo and display the original photo.

In an exemplary implementation, the fingerprint obtaining module according to the present disclosure includes:

a second obtaining unit configured to, when detecting an instruction for triggering an encrypted photographing mode, obtain an entered current fingerprint;

a determining unit configured to determine whether the current fingerprint conforms to a preset fingerprint database; and a starting unit configured to, if the current fingerprint conforms to the preset fingerprint database, start the encrypted photographing mode and set the current fingerprint to be an unlocking fingerprint.

In an exemplary implementation, the key generating module according to the present disclosure includes:

a first generating unit configured to, when detecting a photographing instruction, generate a fingerprint recognition code according to the unlocking fingerprint; and a second generating unit configured to generate the key pair according to the fingerprint recognition code, wherein the key pair comprises the encryption key and the decryption key.

In an exemplary implementation, the encrypting module according to the present disclosure may include:

an encrypting unit configured to encrypt the original photo using a symmetric encryption algorithm according to the encryption key, and generate the encrypted photo.

The present disclosure provides an encrypted photographing method based on fingerprint recognition, and a system thereof. The method includes: when detecting starting an encrypted photographing mode, obtaining an unlocking fingerprint for starting the encrypted photographing mode; when detecting a photographing instruction, generating an original photo and generating a key pair based on the unlocking fingerprint wherein the key pair comprises an encryption key and a decryption key; encrypting the original photo according to the encryption key so as to generate an encrypted photo; and generating a corresponding system directory according to the decryption key, and saving the encrypted photo to the system directory. The present invention, by generating an encrypted photo and a decryption key according to an unlocking fingerprint of a user when photographing so that the encrypted photo can only be opened by the decryption key, achieves the encryption of the photographed photo, improves the security of the photo, and avoids leaking the content of an encrypted photo.

DETAILED DESCRIPTION

The present disclosure provides an encrypted photographing method based on fingerprint recognition, and a system thereof. In order to make the objects, technical solutions and effects of the present disclosure more clear and definite, the present invention will be disclosed in detail below with reference to the accompanying drawings. It is understood that the specific embodiments described herein are merely for the purpose of describing the present invention, and are not intended to limit the scope of the present invention.

In the present disclosure, the use of suffixes such as "module", "portion" or "unit" for indicating an element is merely for the purpose of describing the present invention easily, yet these words do not have a specific meaning per se. Thus, "modules", "portion" or "unit" can be used in combination in the description.

A terminal device can be implemented in various forms. For example, the terminal device mentioned in the present disclosure may include, for example, a mobile phone, a smart phone, a notebook computer, a digital broadcast receiver, a PDA (Personal Digital Assistant), a PAD (Tablet), a PMP (Portable Multimedia Player), a navigation device, and other types of mobile terminals, as well as fixed terminals, such as digital TVs, desktop computers and the like. However, a person of ordinary skill in the art would appreciate that in addition to being used in various types of mobile devices, the configurations in accordance with the embodiments of the present disclosure may also be used in those fixed type terminals.

The contents of the present disclosure are further described through the following description of certain embodiments of the present disclosure with reference to the accompanying drawings.

Figure 1:
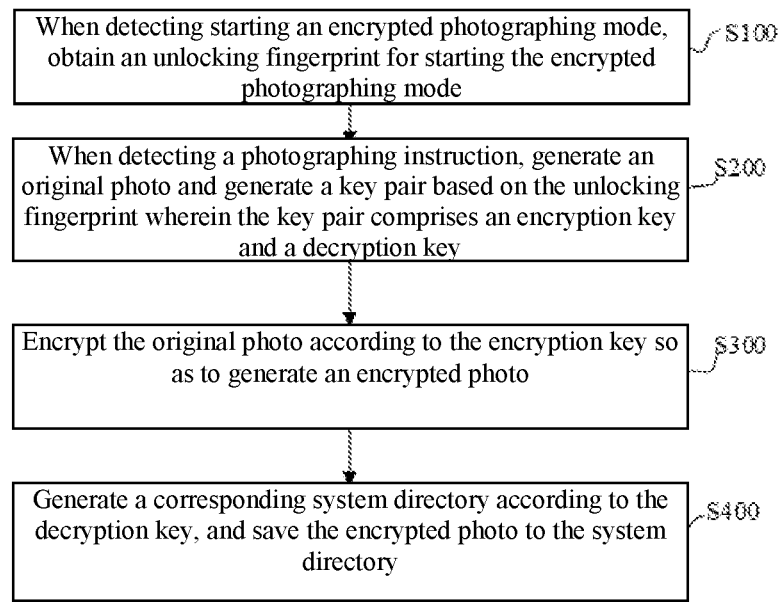
FIG. 1 illustrates a flowchart of an exemplary implementation of an encrypted photographing method based on fingerprint recognition according to the present disclosure.

FIG. 1 illustrates a flowchart of an exemplary implementation of an encrypted photographing method based on fingerprint recognition according to the present disclosure. As shown in FIG. 1, the method includes:

when detecting starting an encrypted photographing mode, obtaining an unlocking fingerprint for starting the encrypted photographing mode. (block S100)

In an exemplary implementation, the encrypted photographing mode can be a photographing application (App) pre-installed in a mobile terminal. Two kinds of photographing modes can be preset in the mobile terminal; one can be a normal photographing mode, and the other one can be an encrypted photographing mode. The photo taken in the normal photographing mode can be an unencrypted photo, and an unencrypted photo can be directly viewed or browsed on any mobile terminal. The encrypted photographing mode refers to an encrypted photographing mode using fingerprint technology. To enable the encrypted photo mode, a preset fingerprint needs to be entered. In one embodiment, a fingerprint database may be preset in the mobile terminal, and the encrypted photographing mode can be unlocked and started only when the entered fingerprint conforms to the fingerprint database. Therefore, before the step of, when detecting starting an encrypted photographing mode, obtaining an unlocking fingerprint for starting the encrypted photographing mode, the method may further include a step of setting up a fingerprint database in advance. The process of pre-setting the fingerprint database specifically includes:

obtaining a plurality of fingerprint data; (H1) and generating a fingerprint database with the plurality of fingerprint data. (H2)

In one embodiment, the plurality of fingerprint data refers to a plurality of fingerprint data entered by a user, such as a fingerprint 1, a fingerprint 2, a fingerprint 3, and the like. The plurality of fingerprint data can be saved together to form a fingerprint database. When the user triggers an instruction to start the photographing mode, the photographing mode can be started by means of verifying whether the current fingerprint entered by the user conforms to the fingerprint database.

In one embodiment, the step of, when detecting starting an encrypted photographing mode, obtaining an unlocking fingerprint for starting the encrypted photographing mode may include:

when detecting an instruction for triggering an encrypted photographing mode, obtaining an entered current fingerprint; (step S101)

determining whether the current fingerprint conforms to a preset fingerprint database; (step S102) and if the current fingerprint conforms to the preset fingerprint database, starting the encrypted photographing mode and setting the current fingerprint to be an unlocking fingerprint. (step S103)

In one embodiment, in step S101, the current fingerprint refers to the fingerprint data that is entered by the user when the encrypted photographing mode is triggered. In step S102, the process of determining whether the current fingerprint conforms to a preset fingerprint database includes:

comparing the current fingerprint with a plurality of fingerprints in the preset fingerprint database; (H10)

if the current fingerprint is the same as any fingerprint data among the plurality of fingerprint data, determining that the current fingerprint conforms to the preset fingerprint database; (H20) and if the current fingerprint is not the same as any fingerprint data among the plurality of fingerprint data, determining that the current fingerprint does not conform to the preset fingerprint database. (H30)

In one embodiment, there may be slight differences in the fingerprint data entered by the same finger each time, so a threshold can be set in advance, for example, 95%. When the similarity between the current fingerprint and the fingerprint data in the preset fingerprint database is greater than the threshold value, it can be determined that the current fingerprint is the same as the fingerprint data in the preset fingerprint database. When the similarity between the current fingerprint and the fingerprint data in the preset fingerprint database is less than the threshold value, it can be determined that the current fingerprint is different from the fingerprint data in the preset fingerprint database.

In step S103, if the current fingerprint conforms to the preset fingerprint database, the encrypted photographing mode will be started, and the current fingerprint can be set as an unlocking fingerprint.

In one embodiment, step S100 may further include a step S104 as follows: if the current fingerprint does not match the preset fingerprint database, the encrypted photographing mode will not be started, and the user can be prompted to continue to enter the current fingerprint. In practice, the user's finger may accidentally touch the fingerprint entry area. In order to avoid a potential misoperation, in the case when the user keeps entering the current fingerprint that does not match the fingerprint database for more than a preset number of times, the user will not be allowed to enter the current fingerprint again during a preset period of time. The value of the preset number of times may be 3 times, 4 times, 5 times, or the like. The preset period of time may be 30 S, 1 min, and the like.

It should be noted that, in certain embodiments, the unlocking fingerprint may also be a preset default unlocking fingerprint. For example, the fingerprint 1 can be set as a default unlocking fingerprint, that is, each time only the fingerprint 1 can be used to start the encrypted photographing mode. Certainly, the default unlocking fingerprint may also be the same as the unlocking fingerprint of the mobile terminal. When the mobile terminal is unlocked through its fingerprint unlocking mode, the unlocking fingerprint can be set as the unlocking fingerprint in this case. When the encrypted photographing application is triggered in the fingerprint unlocking mode, the encrypted photographing application is directly started, and the unlocking fingerprint used is obtained as an unlocking fingerprint, so that the encrypted photographing application can be started without verifying the unlocking fingerprint for each time. In this way, the present invention shortens the process of taking encrypted pictures and brings convenience to users.

The method may further include: when detecting a photographing instruction, generating an original photo and generating a key pair based on the unlocking fingerprint wherein the key pair comprises an encryption key and a decryption key. (block S200)

In certain embodiments, the unlocking fingerprint refers to the current fingerprint used last time to start the encrypted photographing mode. In addition, the unlocking fingerprint used each time to start the encrypted photographing mode can be different, for example, in the case when the fingerprint 1 was used last time to start the encrypted photographing mode, the fingerprint 1 would be the unlocking fingerprint last time for starting the encrypted photographing mode. In the case when currently it is fingerprint 2 that is used to start the encrypted photographing mode, the fingerprint 2 would be the unlocking fingerprint this time for starting the encrypted photographing mode. The photos taken can be encrypted with the specific unlocking fingerprint used at that time to start the encrypted photographing mode. This makes it easy for a user to set the fingerprint data used with those photos, so that it is easy to find the corresponding decryption key when unlocking the encrypted photo later.

In certain embodiments, a fingerprint may be preset as a default unlocking fingerprint, and the default unlocking fingerprint must be used to unlock each time so as to start the encrypted photographing mode. The original photo herein refers to an unencrypted photo. The encryption key is used to encrypt the original photo, and the decryption key is used for decryption. The encryption key and the encryption key appear in a pair.

In an embodiment, block S200 further includes:

when detecting a photographing instruction, generating a fingerprint recognition code according to the unlocking fingerprint; (step S201) and generating the key pair according to the fingerprint recognition code, wherein the key pair comprises the encryption key and the decryption key. (step S202)

In one embodiment, in step S201, the photographing instruction is a type of shutter instruction, which can be implemented via touching a screen or pressing a physical button. In another embodiment, the photographing instruction may be issued through entering the unlocking fingerprint. The fingerprint recognition code can be a sequence code generated based on the unlocking fingerprint. The fingerprint recognition code is in a one-to-one correspondence with the unlocking fingerprint, and one unlocking fingerprint generates a unique fingerprint recognition code. In the case where the fingerprint 1 is the unlocking fingerprint, the fingerprint 1 corresponds to a fingerprint recognition code; while in the case where the fingerprint 2 is the unlocking fingerprint, the fingerprint 2 corresponds to a fingerprint recognition code. In step S202, a key pair can be generated according to the fingerprint recognition code, and a fingerprint recognition code generates a unique pair of keys, that is, one fingerprint recognition code corresponds to one encryption key and one decryption key.

In one embodiment, the method further includes: encrypting the original photo according to the encryption key to generate an encrypted photo. (block S300)

In one embodiment, the encryption key is used to encrypt the original photo. For example, the step of encrypting the original photo may include encrypting the original photo using a symmetric encryption algorithm according to the encryption key, and generating the encrypted photo. In such a case, the symmetric encryption algorithm refers to that the same key is used for both encryption and decryption, that is, the encryption key for encrypting the original photo is the same as the decryption key for decrypting the encrypted photo, and such a key can be, for example, DES (Data Encryption Standard), 3DES (Triple DES) encryption algorithm, and the like. When a user wants to view the encrypted photo, the decryption key corresponding to the encryption key must be used to decrypt the encrypted photo, thereby enabling viewing and browsing of the decrypted photo.

In one embodiment, the method further includes: generating a corresponding system directory according to the decryption key, and saving the encrypted photo to the system directory. (block S400)

In one embodiment, the system directory refers to a system folder having the decryption key as its identifier. The system directory is in a one-to-one correspondence with the decryption key, that is, all the encrypted photos corresponding to the same decryption key are saved in the same system directory. In an embodiment, since the decryption key is generated based on the fingerprint recognition code, the decryption key is in a one-to-one correspondence with the fingerprint recognition code, such that the system directory may be generated according to the unlocking fingerprint, and the encrypted photo corresponding to the unlocking fingerprint thus is saved to the system directory. When the user needs to view the encrypted photo, the corresponding system directory can be determined according to the unlocking fingerprint, and the corresponding decryption key is then obtained from the system directory to decrypt the encrypted photo. In one embodiment, when the user sends the encrypted photo to a trusted person for viewing, the user can quickly find the corresponding decryption key according to the unlocking fingerprint and send the decryption key to a recipient, so that the recipient can use the decryption key to decrypt the encrypted photo.

In one embodiment, the encrypted photographing method based on fingerprint recognition may further include a step of decryption, and the decryption process may include:

when receiving an instruction to view the encrypted photo, obtaining a corresponding decryption key according to the system directory for saving the encrypted photo; (S001)

using the decryption key to decrypt the encrypted photo; (S002) and if the decryption is successful, providing a viewing permission for the encrypted photo and displaying the original photo. (S003)

In one embodiment, when an instruction to view the encrypted photo is received, the system directory storing the encrypted photo can be obtained according to the saving path of the encrypted photo, and then a decryption key corresponding thereto can be obtained according to the system directory, next the encrypted photo can be decrypted using the obtained decryption key, and if the decryption is successful, the content of the encrypted photo will be displayed.

In another embodiment of the present disclosure, when an encrypted photo is received, and the encrypted photo is to be viewed, the decryption key for the encrypted photo may be requested from the sender; when the sender sends the decryption key, the received decryption key is then used to decrypt the encrypted photo. If the decryption is successful, a viewing permission for the encrypted photo will be provided, and the content of the original photo is displayed; if the decryption is unsuccessful, the viewing permission of the encrypted photo will not be provided. In this way, when a photo is taken, the captured photo is encrypted by the encryption key generated by the fingerprint recognition code corresponding to the unlocking fingerprint. When viewing the encrypted photo is requested, the decryption key corresponding to the unlocking fingerprint must be used to decrypt the encrypted photo. Thus, the content of the photo can be viewed without leakage of the content of the photo, and thus it provides a certain level of security for the photo content.

Figure 2:
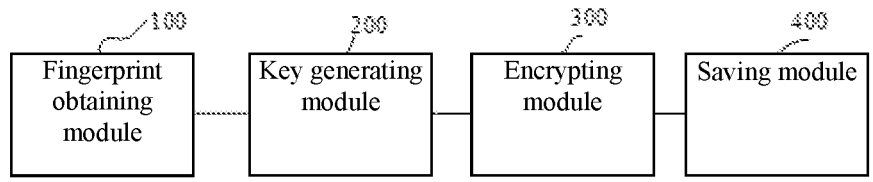
FIG. 2 illustrates a schematic structural diagram of an exemplary implementation of an encrypted photographing system based on fingerprint recognition according to the present disclosure.

In another aspect of the present disclosure, an encrypted photographing system based on fingerprint recognition is disclosed. As shown in FIG. 2, the system may include:

a fingerprint obtaining module 100 configured to, when detecting starting an encrypted photographing mode, obtain an unlocking fingerprint for starting the encrypted photographing mode;

a key generating module 200 configured to, when detecting a photographing instruction, generate an original photo and generate a key pair based on the unlocking fingerprint wherein the key pair comprises an encryption key and a decryption key;

an encrypting module 300 configured to encrypt the original photo according to the encryption key to generate an encrypted photo; and a saving module 400 configured to generate a corresponding system directory according to the decryption key, and save the encrypted photo to the system directory.

The encrypted photographing system based on fingerprint recognition may further include a decrypting module, wherein the decrypting module may include:

a first obtaining unit configured to, when receiving an instruction to view the encrypted photo, obtain a corresponding decryption key according to the system directory where the encrypted photo is saved;

a decrypting unit configured to use the decryption key to decrypt the encrypted photo; and a displaying unit configured to, if the decryption is successful, provide a viewing permission for the encrypted photo and display the original photo.

In one embodiment, the fingerprint obtaining module 100 may include:

a second obtaining unit configured to, when detecting an instruction for triggering an encrypted photographing mode, obtain an entered current fingerprint;

a determining unit configured to determine whether the current fingerprint conforms to a preset fingerprint database; and a starting unit configured to, if the current fingerprint conforms to the preset fingerprint database, start the encrypted photographing mode and set the current fingerprint to be an unlocking fingerprint.

In one embodiment, the key generating module 200 may include:

a first generating unit configured to, when detecting a photographing instruction, generate a fingerprint recognition code according to the unlocking fingerprint; and a second generating unit configured to generate the key pair according to the fingerprint recognition code, wherein the key pair comprises the encryption key and the decryption key.

In one embodiment, the encrypting module 300 may include:

an encrypting unit configured to encrypt the original photo using a symmetric encryption algorithm according to the encryption key, and generate the encrypted photo.

For embodiments provided by the present disclosure, it should be understood that the disclosed systems and methods may be implemented in other manners. For example, the device embodiments described above are merely illustrative. For example, the division of the modules is only a logical functional division. In an implementation, there may be another division manner, for example, multiple units or components may be combined together or can be integrated into another system, or some features can be omitted or not executed. In addition, the coupling or direct coupling or communication connection shown or discussed herein may be an indirect coupling or communication connection through some interface, device or unit, and may be electrical, mechanical or other types of connection.

The units described as separate components may or may not be physically separated, and the components displayed as units may or may not be physical units, that is, may be located in one place, or may be distributed to multiple network units. Some or all of the units may be selected according to actual needs to achieve the purpose of the solution of an embodiment.

In addition, each functional unit in one embodiment of the present disclosure may be integrated into one processing unit, or each unit may exist physically separately, or two or more units may be integrated into one unit. Moreover, such an integrated unit can be implemented in the form of hardware or in the form of hardware plus software functional units.

The integrated unit mentioned above can be implemented in the form of a software functional unit and can be stored in a computer readable storage medium. The software functional unit described above can be stored in a storage medium and may include the instructions for causing a computer device (which may be a personal computer, a server, or a network device, etc.) or a processor to perform certain steps of the methods of the various embodiments of the present disclosure. The foregoing storage media include: a USB disk, a mobile hard disk, a read-only memory (ROM), a random access memory (RAM), a magnetic disk, an optical disk, and the like, which can store program codes.

Finally, it should be noted that the above embodiments are only used to describe the technical solutions of the present disclosure, rather than limit the technical solutions. Although the present invention has been described in detail with reference to the foregoing embodiments, a person skilled in the art should understand that the technical solutions described in the foregoing embodiments may be modified or equivalently substituted for some of the technical features. The modifications and substitutions of the present invention do not depart from the principles and scope of the technical solutions of the embodiments of the present disclosure.

The invention claimed is:

1. An encrypted photographing method based on fingerprint recognition, the method comprising:
   detecting an instruction for triggering an encrypted photographing mode;
   in response to the detecting the instruction for triggering the encrypted photographing mode, obtaining a current fingerprint;
   determining whether the current fingerprint conforms to a preset fingerprint database;
   in response to the determining that the current fingerprint conforms to the preset fingerprint database, starting the encrypted photographing mode and setting the current fingerprint to be an unlocking fingerprint;
   in response to detecting a photographing instruction, generating an original photo and generating a key pair based on the unlocking fingerprint, wherein the key pair comprises an encryption key and a decryption key;
   encrypting the original photo according to the encryption key to generate an encrypted photo;
   generating a corresponding system directory according to the decryption key, and saving the encrypted photo to the system directory;
   when receiving an instruction to view the encrypted photo, obtaining a corresponding decryption key according to the system directory where the encrypted photo is saved;
   using the decryption key to decrypt the encrypted photo; and
   providing a viewing permission for the encrypted photo and displaying the original photo.

2. The encrypted photographing method according to claim 1, wherein the generating a key pair based on the unlocking fingerprint, comprises:
   in response to the detecting the photographing instruction, generating a fingerprint recognition code according to the unlocking fingerprint, and
   generating the key pair according to the fingerprint recognition code, wherein the key pair comprises the encryption key and the decryption key.

3. The encrypted photographing method according to claim 1, wherein the encrypting comprises:
   encrypting the original photo using a symmetric encryption algorithm according to the encryption key, and generating the encrypted photo.

4. The encrypted photographing method according to claim 1, wherein the preset fingerprint database comprises a plurality of fingerprint data.

5. The encrypted photographing method according to claim 1, wherein the encryption key and the decryption key are the same.

6. The encrypted photographing method according to claim 1, wherein the photographing instruction comprises a shutter instruction.

7. An encrypted photographing method based on fingerprint recognition, the method comprising:
   detecting starting an encrypted photographing mode;
   in response to the detecting starting the encrypted photographing mode, obtaining an unlocking fingerprint for starting the encrypted photographing mode;
   in response to detecting a photographing instruction, generating an original photo and generating a key pair based on the unlocking fingerprint, wherein the key pair comprises an encryption key and a decryption key;
   encrypting the original photo according to the encryption as to generate an encrypted photo;
   generating a corresponding system directory according to the decryption key, and saving the encrypted photo to the system directory.

8. The encrypted photographing method according to claim 7, wherein the method further comprises:
   when receiving an instruction to view the encrypted photo, obtaining a corresponding decryption key according to the system directory where the encrypted photo is saved;
   using the decryption key to decrypt the encrypted photo; and
   providing a viewing permission for the encrypted photo and displaying the original photo.

9. The encrypted photographing method according to claim 7, wherein the obtaining an unlocking fingerprint for starting the encrypted photographing mode further comprises:
   obtaining current fingerprint;
   determining whether the current fingerprint conforms to a preset fingerprint database; and in response to the determining that the current fingerprint conforms to the preset fingerprint database, starting the encrypted photographing mode and setting the current fingerprint to be the unlocking fingerprint.

10. The encrypted photographing method according to claim 9, wherein the preset fingerprint database comprises a plurality of fingerprint data.

11. The encrypted photographing method according to claim 7, wherein the generating a key pair based on the unlocking fingerprint comprises:
in response to detecting the photographing instruction, generating a fingerprint recognition code according to the unlocking fingerprint; and
generating the key pair according to the fingerprint recognition code, wherein the key pair comprises the encryption key and the decryption key.

12. The encrypted photographing method according to claim 7, wherein the encrypting comprises:
encrypting the original photo using a symmetric encryption algorithm according to the encryption key, and generating the encrypted photo.

13. The encrypted photographing method according to claim 7, wherein the encryption key and the decryption key are the same.

14. An encrypted photographing system based on fingerprint recognition, the system comprising:
a fingerprint obtaining module including at least one processing chip configured to, when detecting starting an encrypted photographing mode, obtain an unlocking fingerprint for starting the encrypted photographing mode;
a key generating module including at least one processing chip configured to, when detecting a photographing instruction, generate an original photo and generate a key pair based on the unlocking fingerprint, wherein the key pair comprises an encryption key and a decryption key;
an encrypting module including at least one processing chip configured to encrypt the original photo according to the encryption key to generate an encrypted photo; and
a saving module including at least one processing chip configured to generate a corresponding system directory according to the decryption key, and save the encrypted photo to the system directory.

15. The encrypted photographing system according to claim 14, wherein the system further comprises a decrypting module, wherein the decrypting module comprises:
a first obtaining unit including at least one processing chip configured to, when receiving an instruction to view the encrypted photo, obtain a corresponding decryption key according to the system directory where the encrypted photo is saved;
a decrypting unit including at least one processing chip configured to use the decryption key to decrypt the encrypted photo; and
a displaying unit including at least one processing chip configured to provide a viewing permission for the encrypted photo and display the original photo.

16. The encrypted photographing system according to claim 14, wherein the fingerprint obtaining module comprises:
a second obtaining unit configured to, when detecting an instruction for triggering an encrypted photographing mode, obtain a current fingerprint;
a determining unit configured to determine whether the current fingerprint conforms to a preset fingerprint database; and
a starting unit configured to start the encrypted photographing mode and set the current fingerprint to be an unlocking fingerprint when the current fingerprint conforms to the preset fingerprint database.

17. The encrypted photographing system according to claim 16, wherein the preset fingerprint database comprises a plurality of fingerprint data.

18. The encrypted photographing system according to claim 14, wherein the key generating module comprises:
a first generating unit configured to, when detecting a photographing instruction, generate a fingerprint recognition code according to the unlocking fingerprint;
a second generating unit configured to generate the key pair according to the fingerprint recognition code, wherein the key pair comprises the encryption key and the decryption key.

19. The encrypted photographing system according to claim 14, wherein the encrypting module comprises:
an encrypting unit configured to encrypt the original photo using a symmetric encryption algorithm according to the encryption key, and generate the encrypted photo.

20. The encrypted photographing system according to claim 14, wherein the encryption key and the decryption key are the same.

* * * * *